United States Patent [19]

Ballou et al.

[11] 4,101,644
[45] Jul. 18, 1978

[54] PROCESS FOR THE PREPARATION OF CALCIUM SUPEROXIDE

[76] Inventors: Robert A. Frosch, Acting Administrator of the National Aeronautics and Space Administration, with respect to an invention of; E. Vernon Ballou, Santa Clara, Calif.; Peter C. Wood, San Jose, Calif.; Theordore J. Wydeven, Jr., Sunnyvale, Calif.; LeRoy A. Spitze, Morgan Hill, Calif.

[21] Appl. No.: 814,378

[22] Filed: Jul. 11, 1977

[51] Int. Cl.² ................................ C01B 15/043
[52] U.S. Cl. ................................ 423/581; 23/252 R
[58] Field of Search .......................... 423/581

[56] References Cited

U.S. PATENT DOCUMENTS

| 3,120,997 | 2/1964 | Petrocelli | 423/581 |
| 3,816,604 | 6/1964 | Malafosse | 423/581 |

OTHER PUBLICATIONS

Vol'nov et al., Izv, Akad, Nauk SSSR, Ser Khim 1966 (11), 2032-2033 (Russ.) — Chem. Abs., vol. 66 (1967), 72025x.

Kirk-Othmer, Encyclopedia of Chemical Technology, Second Edition, vol. 13 (1962), pp. 861, 862.

*Primary Examiner*—O. R. Vertiz
*Assistant Examiner*—Wayne A. Langel
*Attorney, Agent, or Firm*—Armand McMillan; John R. Manning; Darrell G. Brekke

[57] ABSTRACT

Calcium superoxide is prepared in high yields by spreading a quantity of calcium peroxide diperoxyhydrate on the surface of a container over an area of 18 to 300 cm² per gram of diperoxyhydrate; positioning said container in a vacuum chamber on a support structure through which a coolant fluid can be circulated; partially evacuating said vacuum chamber, allowing the temperature of the diperoxyhydrate to reach to a level within the range of about 0° to about 40° C, with the assistance of an external source of heat or liquid coolant, as needed; maintaining the temperature selected for a period of time sufficient to complete the disproproriation of the diperoxyhydrate to calcium superoxide, calcium hydroxide, oxygen and water; while maintaining the partial vacuum, constantly and systematically removing the water as it is formed by sweeping the reacting material with a current of dry inert gas and/or by condensation of said water on a cold surface; backfilling the chamber with a dry inert gas; and finally recovering the calcium superoxide produced.

11 Claims, 7 Drawing Figures

PROCESS FOR THE PREPARATION OF CALCIUM SUPEROXIDE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

DESCRIPTION OF THE PRIOR ART

Interest has centered upon various materials containing a rather high percentage of oxygen which, upon decomposition, liberate molecular oxygen. These materials can function as sources of oxygen in self-contained breathing apparatus and they also possess the capability of removing carbon dioxide from gaseous mixtures. Materials which have been investigated for these uses include alkali metal superoxides such as potassium superoxide. While this latter substance is commonly used, its efficiency is greatly diminished by a tendency to become encased in hydrous coatings of reaction products. Although this problem can be somewhat alleviated by improved canister design and by mixing with a drying agent such as a molecular sieve, a need continues to exist for a peroxide material which has a higher oxygen yield, a greater capability of removing carbon dioxide and, desirably, no surface problems. These objectives have ultimately led to the development of calcium superoxide as a source of oxygen.

Calcium superoxide has been made by the reaction of calcium hydroxide with hydrogen peroxide. But, at best, yields ranging from 35 to 55% have been obtained. Attempts to improve the purity of the reaction product have been made, including the lyophilization of said product but, unfortunately, the higher yields achieved have not been reproducible on a routine basis, the reaction conditions being still imprecisely understood or incompletely controlled.

Accordingly, one object of the present invention is to provide a method of obtaining calcium superoxide in yields of purity higher than heretofore obtained from calcium peroxide diperoxyhydrate.

Another object is to provide a vacuum chamber apparatus for the degradation of $CaO_2.2H_2O_2$ under controlled conditions of temperature and pressure.

Still another object is to devise means for further purifying $CaO_2.2H_2O_2$ by removing excess water and hydrogen peroxide from the material prepared by the reaction of calcium peroxide octahydrate with hydrogen peroxide.

SUMMARY OF THE INVENTION

Briefly, these and other objects of the present invention as shall hereinafter become apparent, can be attained by a method which comprises: spreading calcium peroxide diperoxyhydrate on the surface of a container over an area of 18 to 300 $cm^2$ per gram of diperoxyhydrate; positioning said container in a vacuum chamber on a support structure through which a coolant fluid can be circulated; partially evacuating said vacuum chamber, allowing the temperature of the diperoxyhydrate to reach to a level within the range of about 0° to about 40° C, with the assistance of an external source of heat or liquid coolant, as needed; maintaining the temperature selected for a period of time sufficient to complete the disproportiation of the diperoxyhydrate to calcium superoxide, oxygen and water; while maintaining the partial vacuum, constantly and systematically removing the water as it is formed by sweeping the reacting material with a current of dry inert gas and/or by condensation of said water on a cold surface; backfilling said chamber with a dry inert gas; and finally recovering the calcium superoxide produced.

BRIEF DESCRIPTION OF THE DRAWINGS

A better understanding of the invention and of the several advantages attendant thereto will be readily obtained upon reference to the accompanying drawings.

DETAILED DESCRIPTION OF THE INVENTION

Figure 1:
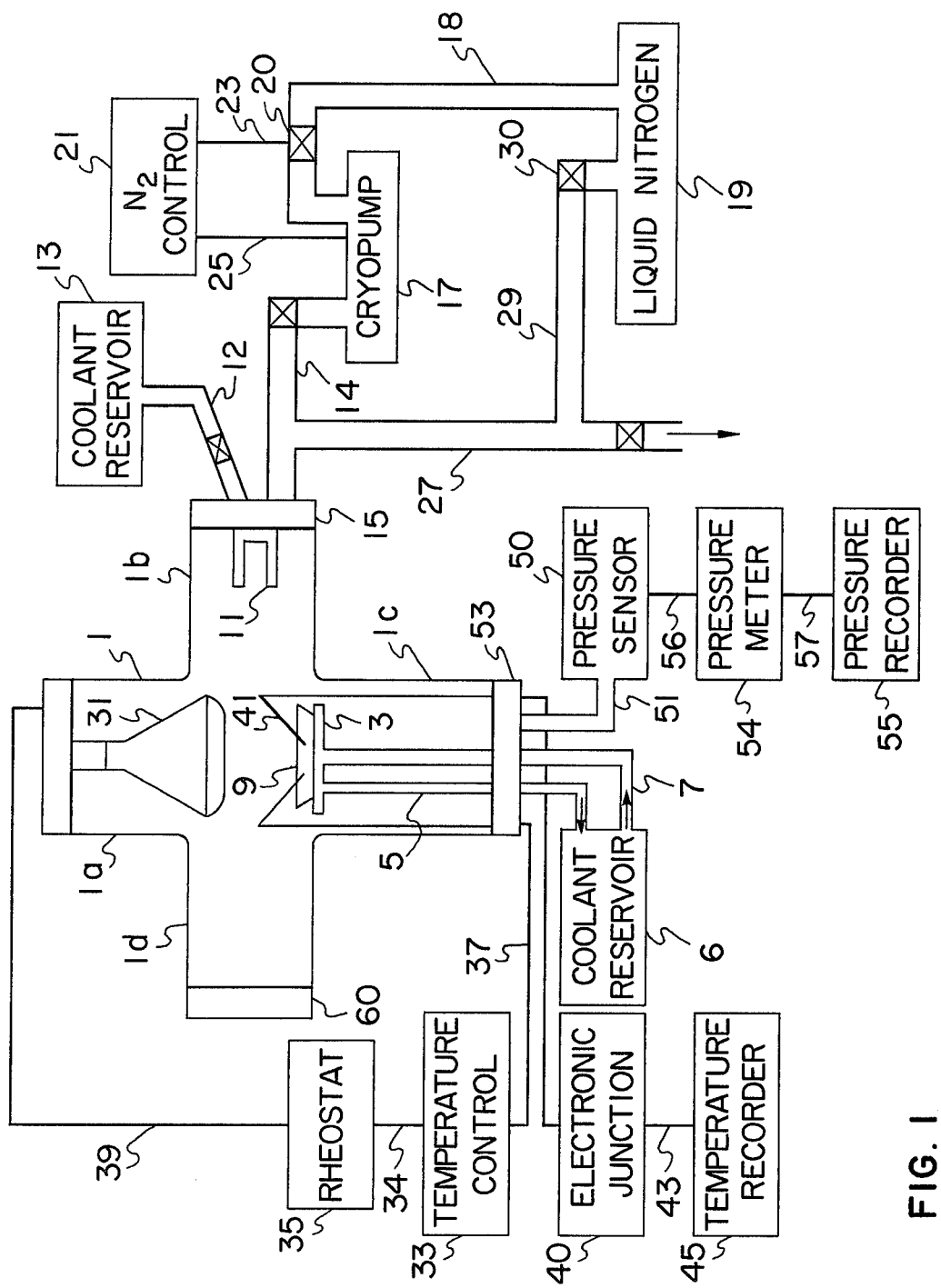
FIGS. 1 and 2 are schematic diagrams of different vacuum apparatus that can be used to carry out the processes of the invention.

Calcium superoxide is generally prepared from calcium peroxide diperoxyhydrate, a compound which will spontaneously undergo disproportionation unless stored at very cold temperatures such as that of liquid nitrogen. The disproportionation reaction takes place as follows:

$$2\ CaO_2.2H_2O_2 \rightarrow Ca(OH)_2 + Ca(O_2)_2 + 3/2\ O_2$$

In past attempts to form calcium superoxide in this manner, it was found that when 1 gram of the peroxydihydrate was decomposed at 40° C for 1 hour while spread over an area of 100 $cm^2$ under a pressure of 6 $\mu m$ Hg, a yield of about 55% superoxide was obtained. Reducing the pressure to $10^{-4}$ $\mu m$ Hg however, actually lowered that yield. It was explained, at the time, that the yield of 55.4% purity was close to the theoretical level predicted for the equimolar disproportionation reaction just illustrated (58.4%) and that not much improvement was therefore possible. In any event, there shall now be disclosed in detail techniques which significantly raise the superoxide purity yield over that which might be expected from the postulated disproportionation reaction.

The method by which calcium peroxide diperoxyhydrate is prepared is not critical. The preferred approach, however, involves the reaction of concentrated hydrogen peroxide solution with calcium peroxide octahydrate.

PREPARATION OF CALCIUM PEROXIDE OCTAHYDRATE - $CaO_2.8H_2O$.

The octahydrate is prepared in a well known manner by reacting a soluble calcium salt hydrate, e.g., a halide or nitrate, with hydrogen peroxide in the presence of dilute aqueous ammonia at a temperature within the range of 0° to 4° C. Due to the fact that the reaction of the calcium salt with the peroxide is exothermic, the solutions are cooled before use and the combining process is carried out at a rate such that the system's temperature remains lower than 4° C. The quantity of hydrogen peroxide used need only be sufficient to form the peroxyhydrate, i.e., about 1 part by weight to 1.6 parts of, e.g., calcium chloride hexahydrate ($CaCl_2.6H_2O$). The concentration of the hydrogen peroxide in aqueous solution normally approximates 2.4 to 2.5% by weight. A typical preparation will involve the combining of a solution containing 2.5% hydrogen peroxide and 2.0% ammonia with a 20% by weight solution of $CaCl_2.6H_2O$, the molar ratio of the salt to the peroxide thus being 1:4. The crystals of octahydrate produced are isolated and dried by any convenient technique such as filtration under a nitrogen, argon or other inert atmosphere, followed by exposure to a common desiccant. Drying the product in a flow of carbon dioxide free air at ambient temperature with a flow rate of 2.4 to 2.8 l/min and a relative humidity of about 26%, will yield an octahydrate of about 100% purity.

PREPARATION OF CALCIUM PEROXIDE DIPEROXYHYDRATE - $Ca(O_2).2H_2O_2$.

This compound can be prepared from calcium peroxide octahydrate by any number of methods, the most favored of which, from the practical point of view, involving the reaction of highly concentrated hydrogen peroxide upon the solid octahydrate, as described by Chamova et al. [*Zhur. Neorg. Khim.*, Vol. 2(2), pp. 263–267 (1957)]. Solution of such concentrations, i.e., 89 to 92% hydrogen peroxide can be prepared by well known techniques such as that described by Schmisse [in *Handbook of Preparative Chemistry*, second edition, Academic Press, New York, Vol. 1, pp. 140–141 (1963)], in which a 90% $H_2O_2$ solution is obtained by the concentration of a 30% solution.

Specifically, calcium peroxide diperoxyhydrate can be prepared by adding to solid calcium peroxide octahydrate a quantity of concentrated hydrogen peroxide sufficient to effect the chemical transformation. This operation is carried out at a rate which allows the temperature to be maintained at about $-15.5°$ to $-15.0°$ C, and takes place generally during a period within 0.75 to 2 hours. Pressure is not critical, being nearly atmospheric. The crystalline product obtained is separated and dried by known techniques, e.g., by filtration and conventional desiccation, and is stored at low temperatures ranging from $-10°$ to, preferably, about $-195°$ C (liquid nitrogen level). A dry inert atmosphere may be employed for the operations just described.

A better quality product may be obtained by washing the dried diperoxyhydrate with a cold dry inert polar liquid, e.g., dry isopropyl alcohol at $-15°$ to $-18.5°$, said liquid effectively removing additional quantities of excess water and hydrogen peroxide and reducing the particle size of the product from a maximum diameter of about 0.3 mm to 0.01 mm. After the washing, the crystals are separated from the liquid and dried, preferably in a flow of carbon dioxide-free air of controlled relative humidity (0 to 0.5%). A product having the theoretical ratio of calcium and active oxygen is thus obtained.

A fundamental consideration upon which are based the improvements contributed by this invention to the conversion of calcium oxide diperoxyhydrate, is the belief that it is essential to remove the water evolved from the diperoxyhydrate decomposition zone of the reactor before that water has had time to react with the superoxide product formed by said decomposition. The removal can be effectively achieved, it has now been discovered, by employing, jointly or separately any of the following techniques, namely: condensing the evolved water on a cold surface, sweeping said water in a controlled manner away from the reaction zone, and controlling the pressure in order to increase the mean free path of the evolved water molecules. The removal of the heat produced by the decomposition reaction has also been improved by adjusting these and other factors and parameters, as shall be disclosed in the course of the subsequent description of the preferred apparatus and process embodiments provided to illustrate but not limit the invention.

One type of apparatus which has been found successful in accomplishing some of these goals is shown schematically in FIG. 1 in the form of a cross-shaped vacuum chamber which provides (1) sufficient space for a sample of $CaO_2.2H_2O_2$ to be spread uniformly over an area sufficient to allow the ready evaporation of evolved water and (2) a cold surface on which this water is either condensed or frozen.

The structure and the general operation of the apparatus of FIG. 1 can be described as follows:

in arm 1c of vacuum chamber 1 is provided a cooling table 3 supported by conduits 5 and 7 through which a liquid coolant is circulated from a constant temperature bath 6. The desired quantity of $CaO_2.2H_2O_2$ to be decomposed is uniformly spread in flat shallow container 9 which is placed onto table 3.

Cold surface 11 which is provided in arm 1b for the condensation of the evolved water can be of any convenient shape or size and is most commonly a device known as a cold finger. Cold surface 11 can be cooled by a liquid, including liquid nitrogen, preferred, and dry ice-cooled methyl alcohol, said liquid being supplied from a reservoir 13 via conduit 12 through endplate 15. Endplate 15 is provided with a second opening to which conduit 14 is attached. The other end of conduit 14 is connected to pump 17, such as a cryopump which in turn is connected to a liquid nitrogen reservoir 19 via conduit 18. The cryopump is capable of providing an effective pumping speed of at least $4.0 \times 10^{-3} m^3/sec$ at 11 $\mu$m-Hg. Liquid nitrogen controller 21 activates the opening and closing of solenoid valve 20 via lead 23 as demanded by cryopump 17 via lead 25. The vacuum chamber 1 is basically evacuated by a roughing pump protected by a cold trap (not shown) attached at the open end of conduit 27. The head gas of the liquid nitrogen storage reservoir is open to the roughing pump via conduit 29 and valve 30.

The sample of $CaO_2.2H_2O_2$ in container 9 may be subjected to heat from a source 31 in arm 1a capable of heating the sample to about 80° C, such as an infrared lamp, a heating coil or the like. By the controlled use of the coolant in coolant table 3 and heat source 31, the temperature of the $CaO_2.2H_2O_2$ sample in container 9 can be maintained to within $\pm 1°$ C over a range of $-20°$ to 80° C. The heat output from source 31 is controlled by a proportional temperature controller 33 in series via lead 34 with rheostat 35. Thermocouple lead 37 embedded in container 9 is connected to controller 33 and lead 39 from source 31 is connected to controller 33 through rheostat 35. The temperature of the contents of container 9 can be determined by embedding thermocouple 41 in container 9 and attaching the other end of the lead to an electronic reference junction 40 connected to temperature recorder 45 via lead 43.

The pressure within vacuum chamber 1 can be determined by a suitable pressure sensor 50, such as a Baratron pressure head, connected to arm 1c of chamber 1 through seal 53 via conduit 51. The pressure sensor is then connected in series to pressure meter 54 and then pressure recorder 55 via leads 56 and 57 respectively.

Arm 1d of vacuum chamber 1 provides access to the interior of the chamber for the transport of reaction chemicals to and from container 9. When chemicals are to be added to the device, the open end of arm 1d is projected into the interior of a device such as a glove bag or glove box (not shown) which contains dry inert gas such as nitrogen or argon. Accordingly, the desired quantity of $CaO_2.2H_2O_2$ can be delivered to container 9 under a totally inert atmosphere. Arm 1d of chamber 1 is sealed from the atmosphere by seal 60.

Figure 2:
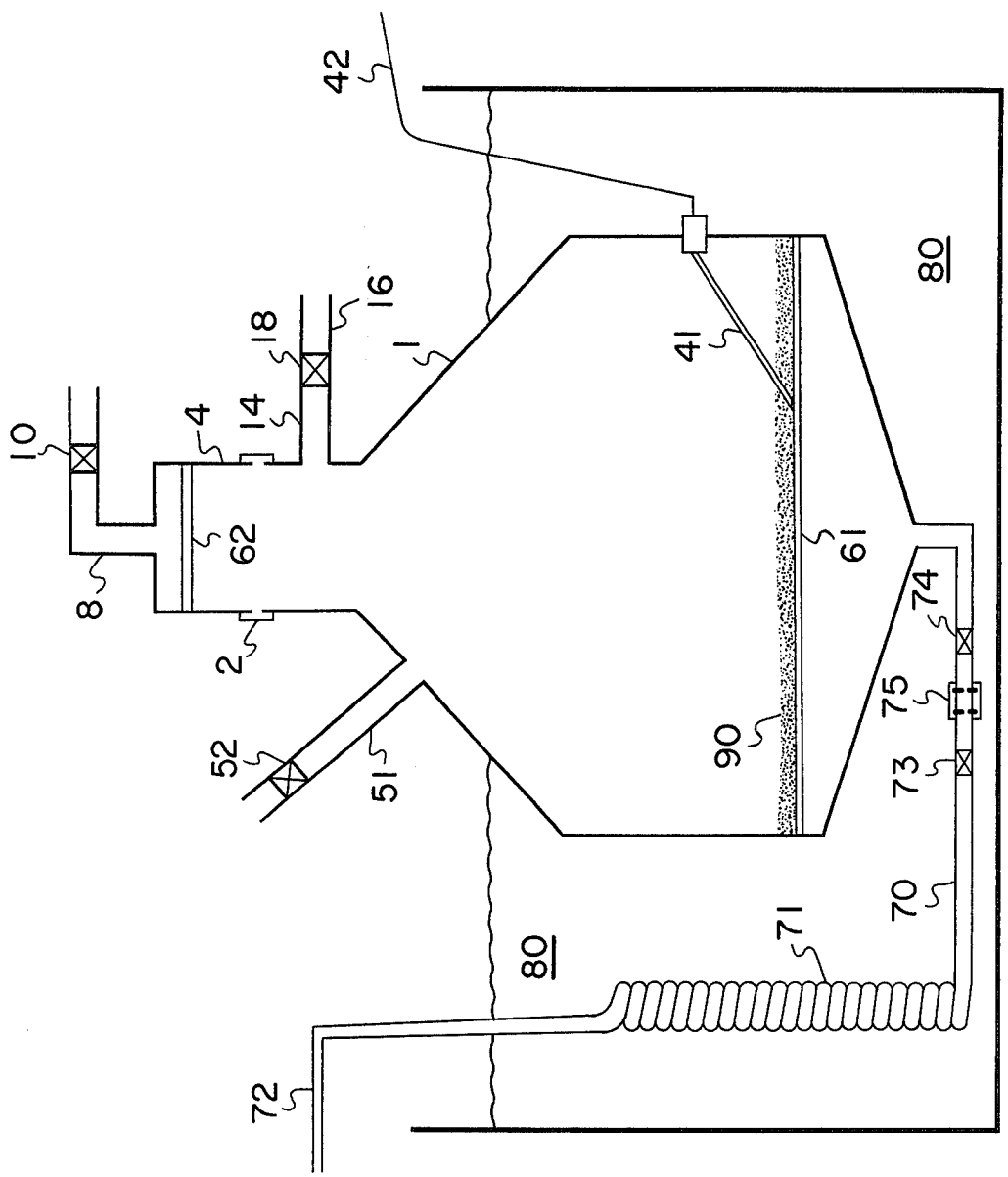

FIG. 2 illustrates schematically another embodiment of a vacuum chamber that can be used to carry out some of the variations disclosed for the process of this invention. In this drawing, numerals corresponding to similar ones in FIG. 1 are used to describe parts that have the same function as those in FIG. 1. Also, some metering and accessory processing equipment is not shown and is described by reference to FIG. 1. The apparatus consists of a vacuum chamber or reaction vessel 1 and a transfer chamber 4 connected together by attaching means 2, and provided with porous plates, e.g., fritted glass plates 61 and 62. The scale of the drawing is too small to show the porous nature of the plates. The assembled vessels 1 and 4 are evacuated by means of a cryopump and a mechanical pump, as shown in FIG. 1, through conduits 14 and 16 joined by bellows seal valve 18. Thermocouple probe 41 with tip submerged in reacting material 90 on plate 61, is connected by lead 42 to a reference junction and a temperature recorder (not shown), as can be seen in FIG. 1. During operations, dry nitrogen gas is led to vessel 1 through conduits 70 and 72 and heat transfer coil 71 in constant temperature bath 80. Pressure is monitored through conduit 51 and valve 52 by means of a sensor meter and recorder arrangement (not shown) in the manner of FIG. 1. Finally, transfer chamber 4 is connected to nitrogen purge line 8 closed by valve 10. After completion of the reaction, the assembly 1 and 4 can be removed from bath 80 by closing valves 10, 18, 52, 73 and 74 and disconnecting joint 75 in conduit 70. The assembly is then upended to allow the reacted material 90 to fall on plate 62. Attaching means 2 are then removed, in an inert atmosphere, and transfer container 4 is sealed with an appropriate closure (not shown), if desired.

The effectiveness of the method and apparatus described for preparing $Ca(O_2)_2$ from $CaO_2.2H_2O_2$ is dependent upon an assortment of variables which include the temperature and pressure at which the decomposition reaction is conducted, the time for the decomposition reaction, the quantity of $CaO_2.2H_2O_2$ spread over a unit area of the container in the vacuum chamber. More specifically, the following limits have been found most satisfactory in the practice of the invention: (a) a spreading area of about 18 to about 300 cm² per gram of diperoxyhydrate; (b) a reaction time ranging from 60 to 90 minutes at 30° C and 20 to 48 hours at 0° C; a reaction temperature within the range of −20° to 30° C; a minimum pressure of 1 $\mu$m Hg for high purity yields and a maximum of less than 100 $\mu$m; and finally, a maximum particle size between 0.50 and 0.01 mm. It shall be appreciated by the man skilled in the art that the actual selection of any specific parameter from these permissible ranges is to some extent dependent upon the other parameters used. For example, the quantity of peroxyhydrate per unit area can be significantly increased when the reaction temperature employed is lowered.

In any event, the invention shall now be illustrated by means of examples which are not to be interpreted as limitations beyond the scope of the claims which follow this disclosure.

EXAMPLE 1

Calcium peroxide diperoxyhydrate was passed through a Tyler #48 sieve and spread uniformly in container 9 of the apparatus described in FIG. 1 with a spreading area of 155 to 159 cm² per gram. The material was heated for 130 minutes at a given temperature under a pressure of 3 to 220 $\mu$m Hg. The reaction vessel was then backfilled with dry nitrogen and the product removed and analyzed for calcium superoxide content by an improved method which shall be discussed later.

Figure 3:
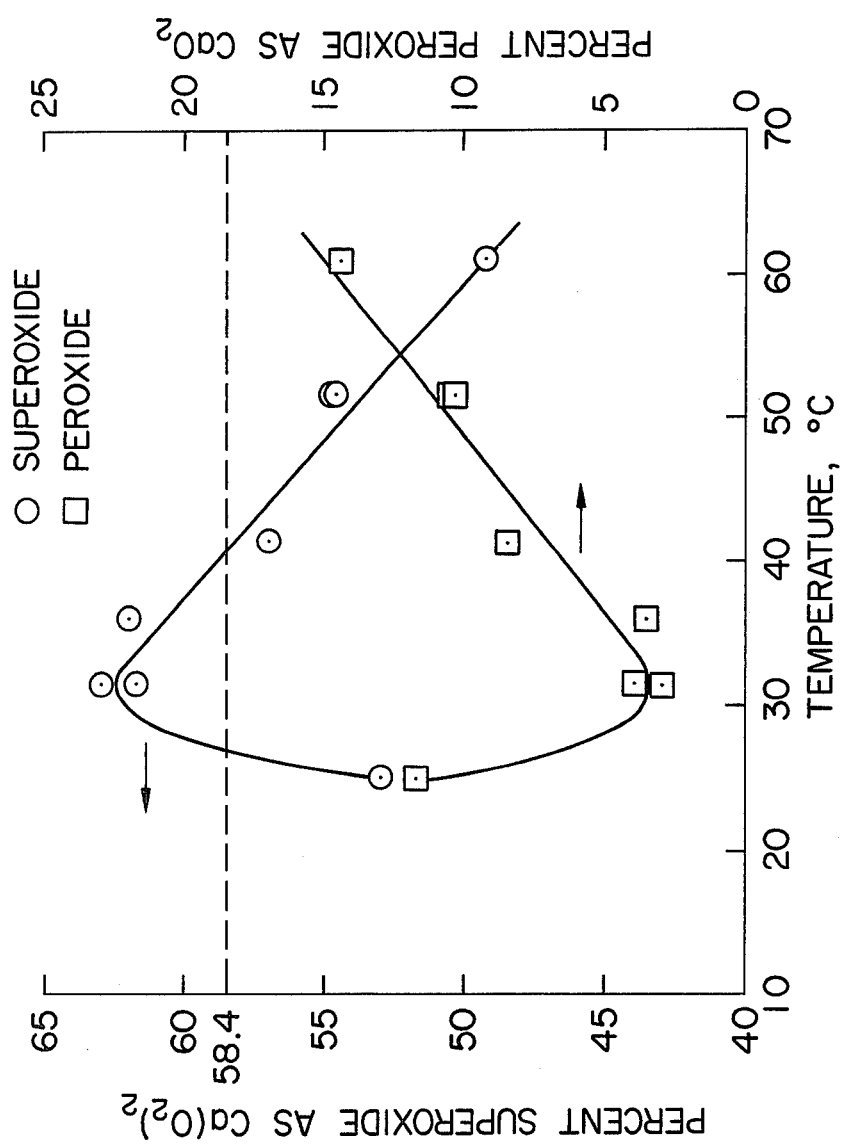
FIGS. 3 to 7 show plots of calcium superoxide percentage of purity obtained, versus various process parameters such as temperature (FIG. 3), reaction time (FIG. 4), inert gas flow (FIG. 5), chamber pressure (FIG. 6), and chamber pressure when an inert gas sweep is employed (FIG. 7).

The temperatures employed in a series of preparations carried out in the manner just described were 25°, 30°, 40°, 50° and 60° C, and the results obtained in terms of $Ca(O_2)_2$ and $CaO_2$ contents are plotted in FIG. 3. As can be readily seen from those data, the $Ca(O_2)_2$ purity yields obtained in the range of about 30° to 40° C are higher than the 58.4% line representing the theoretical proportion of superoxide obtainable by the disproportionation mechanism postulated by the art.

EXAMPLE 2

Figure 4:
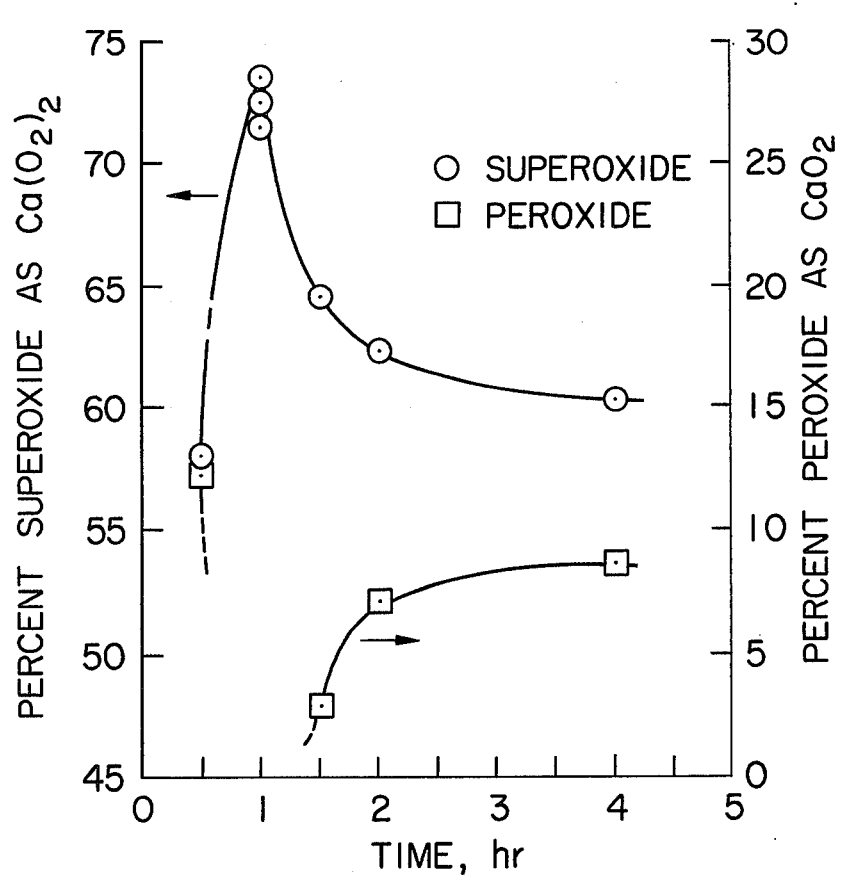

Other runs were carried out essentially in the manner of Example 1, employing the following conditions: material spread: 155 to 162 cm² per gram; temperature, 30° C; and pressure, 6 – 78 $\mu$m Hg. The decomposition reaction was conducted for 30, 60, 90, 120, and 240 minutes and the results obtained are plotted in FIG. 4. As can be readily seen from the plot, the purity yields of superoxide ranged as high as 71 to 73% for a reaction time of 1 hour. Moreover, all yields were higher than those expectable from disproportionation (58.4%). As to the decreasing yields observed for reaction periods longer than 1 hour, it is believed that they can be attributed to reactions between traces of evolved water with the product.

EXAMPLE 3

In an apparatus of the type described in FIG. 2 and provided with the pressure and temperature monitoring equipment such as described in FIG. 1, several decomposition runs were made in which the evolved water and heat were removed from the reaction zone by passing a current of nitrogen gas through the decomposing starting material. No cold surface was provided, as in the previous examples.

The nitrogen gas used was first dried by passage through a liquid nitrogen trap and then adjusted to the reaction temperature selected by passing through a coil immersed in a constant temperature bath set at said temperature and in which the reaction vessel was also immersed, as shown in FIG. 2. The nitrogen was then passed through the porous support 61 and decomposing material, and was subsequently removed by the cryopump in the system. Table I shows the conditions used and the results obtained by varying the flow rate of nitrogen through the apparatus.

TABLE I

Summary of Disproportionation Reaction Conditions and Product Analysis for Various Nitrogen Flow Levels

| Sample No. | Temp.[1] °C | Flow Rate[2] cm³STP/min | Chamber Pressure μm Hg[3,4] Background | Chamber Pressure μm Hg[3,4] Initial | μm Hg[3,4] Maximum | μm Hg[3,4] Final | Spreading Area cm²g$^{-1}$ | Time[5] h | % Ca(O$_2$)$_2$ | % CaO$_2$ |
|---|---|---|---|---|---|---|---|---|---|---|
| 1 | 30.0 | 4.0 | 15 | 85 | 110 | 76 | 79 | 1.5 | 48.5 | 20.1 |
| 2 | 20.0 | 4.0 | 8 | 80 | (150) 90 (115) | 79 | 118 | 3.0 | 48.3 | 19.2 |
| 3 | 20.0 | 4.0 | 5 | 79 | 90 | 80 | 157 | 3.0 | 49.1 | 18.5 |
| 4 | 20.0 | 8.1 | 11 | 80 | 86 | 80 | 159 | 3.0 | 52.3 | 15.3 |
| 5 | 20.0 | 16.2 | 5 | 82 | 85 | 82 | 158 | 3.0 | 59.4 | 11.2 |
| 6 | 20.0 | 24.5 | 6 | 89 | 91 | 89 | 158 | 3.0 | 62.2 | 8.1 |
| 7 | 20.0 | 24.5 | 4 | 89 | 90.5 | 88 | 158 | 3.0 | 62.4 | 8.8 |
| 8 | 20.0 | 32.5 | 6 | 91 | 92 | 91 | 158 | 3.0 | 62.9 | 9.0 |

Figure 5:
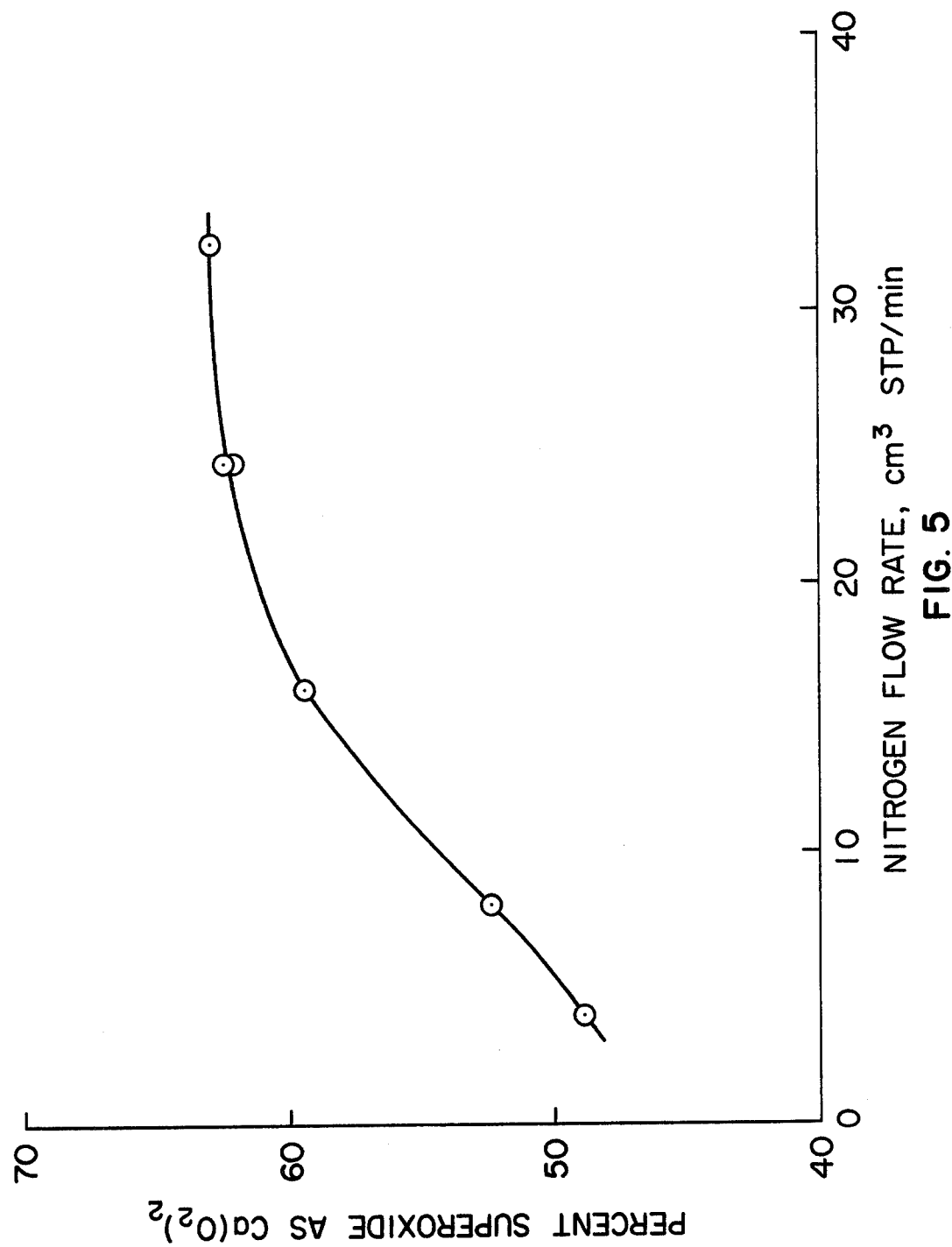

[1] °C + 273 = K
[2] cm³STP/min × 16.67 = mm³STP s$^{-1}$
[3] μm Hg × 0.1333 = Pa
[4] pressures in parentheses indicate momentary pulses during vigorous reaction
[5] h × 3.6 = ks FIG. 5 illustrates the production of calcium superoxide as a function of nitrogen flow in the reaction zone, all other factors being equal: temperature, 20° C; pressure, 80 to 90 μm Hg; time, 3.0 hours; and spread, 157 to 159 cm² per gram. The relatively high purity yields indicate that nitrogen flow is effective in sweeping away evolved water before it can react with the superoxide product. At high flow rates, the purity of the product increased beyond the disproportionation reaction theoretical yield of 58.4%, with maximum advantage obtained at around 30 cm³ STP per minute. At that level, the limiting factor becomes the rate of evolved water vapor diffusion within the reacting substance's granules.

EXAMPLE 4

Figure 6:
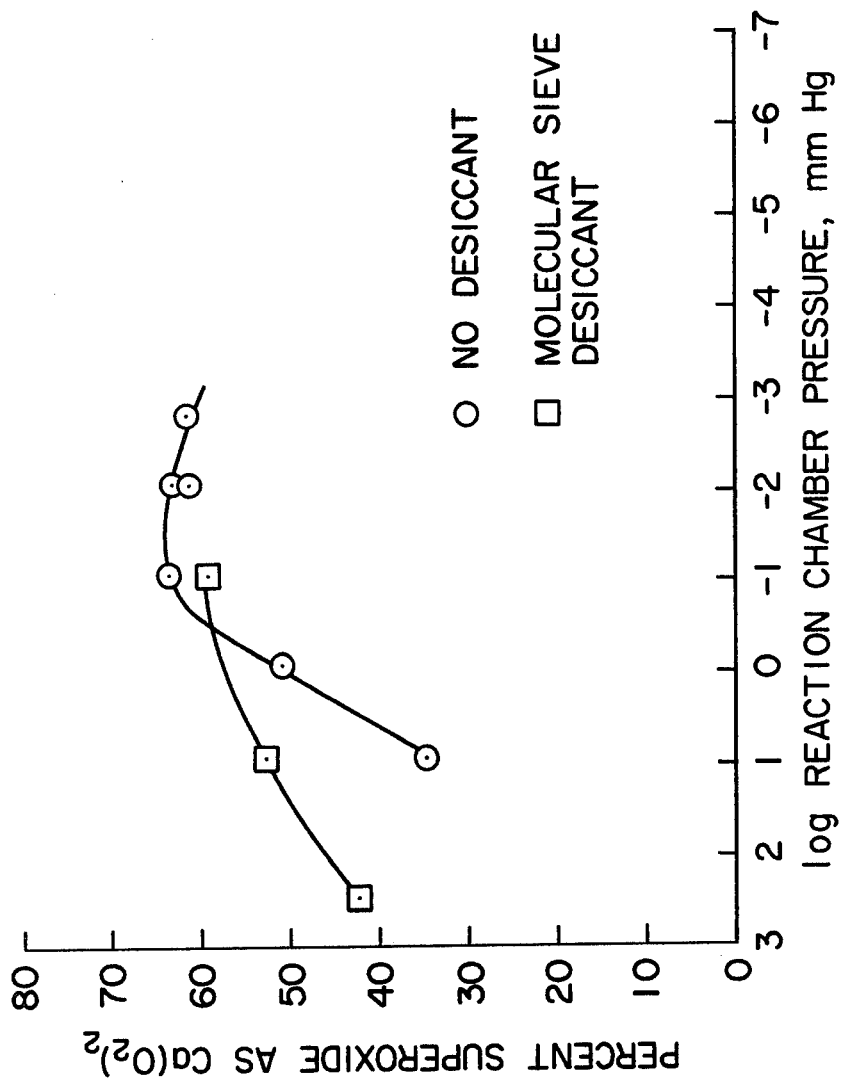

Calcium peroxide diperoxyhydrate was loaded in an apparatus of the type described in FIG. 1 at a charge of about 152 to 155 cm² per gram. The decomposition was allowed to take place at a temperature of 30° C for a period of 1.5 hours. The pressure in the reaction vessel was changed, in different runs, while the rest of the conditions remained substantially constant. The experimental conditions employed and the results obtained are summarized in Table II and the superoxide purity yields are shown in FIG. 6 as a function of system pressure. As can be seen from this plot, the most advantageous pressure for the reaction under the conditions employed is about 90 μm Hg. Yields are definitely lower at higher pressures while they tend to decrease as the pressure becomes sufficiently low to impair the diffusion of the heat generated away from the reacting material.

TABLE II

Disproportionation of CaO$_2$ · 2H$_2$O$_2$ at 30° C[1] and a Range of Pressures

| Sample No. | Pressure Range[2] μm Hg | Time[3] h | Spreading Area cm²/g | Superoxide % Ca(O$_2$)$_2$ | Peroxide % CaO$_2$ |
|---|---|---|---|---|---|
| 1 | 8.8–9.2 × 10³ | 1.5 | 153.2 | 34.9 | 28.4 |
| 2 | 8.8–9.2 × 10² | 1.5 | 154.6 | 51.0 | 16.5 |
| 3 | 8.8–9.1 × 10¹ | 1.5 | 153.8 | 63.5 | 8.2 |
| 4 | 7–11 × 10⁰ (usually 8.5–9.5 × 10⁰) | 1.5 | 155.7 | 61.5 | 11.2 |
| 5 | 8.8–9.2 × 10¹ | 1.5 | 151.9 | 63.6 | 8.0 |
| 6 | 7.5–10.5 × 10⁰ (usually 8.5– 9.5 × 10⁰) | 1.5 | 154.4 | 63.4 | 9.7 |
| 7 | 0.4–6.3 × 10⁰ (usually 1– 3.7 × 10⁰) | 1.5 | 153.8 | 61.5 | 11.4 |

[1] °C + 273 = K
[2] μm Hg × 0.1333 = Pa
[3] h × 3.6 = ks

Figure 7:
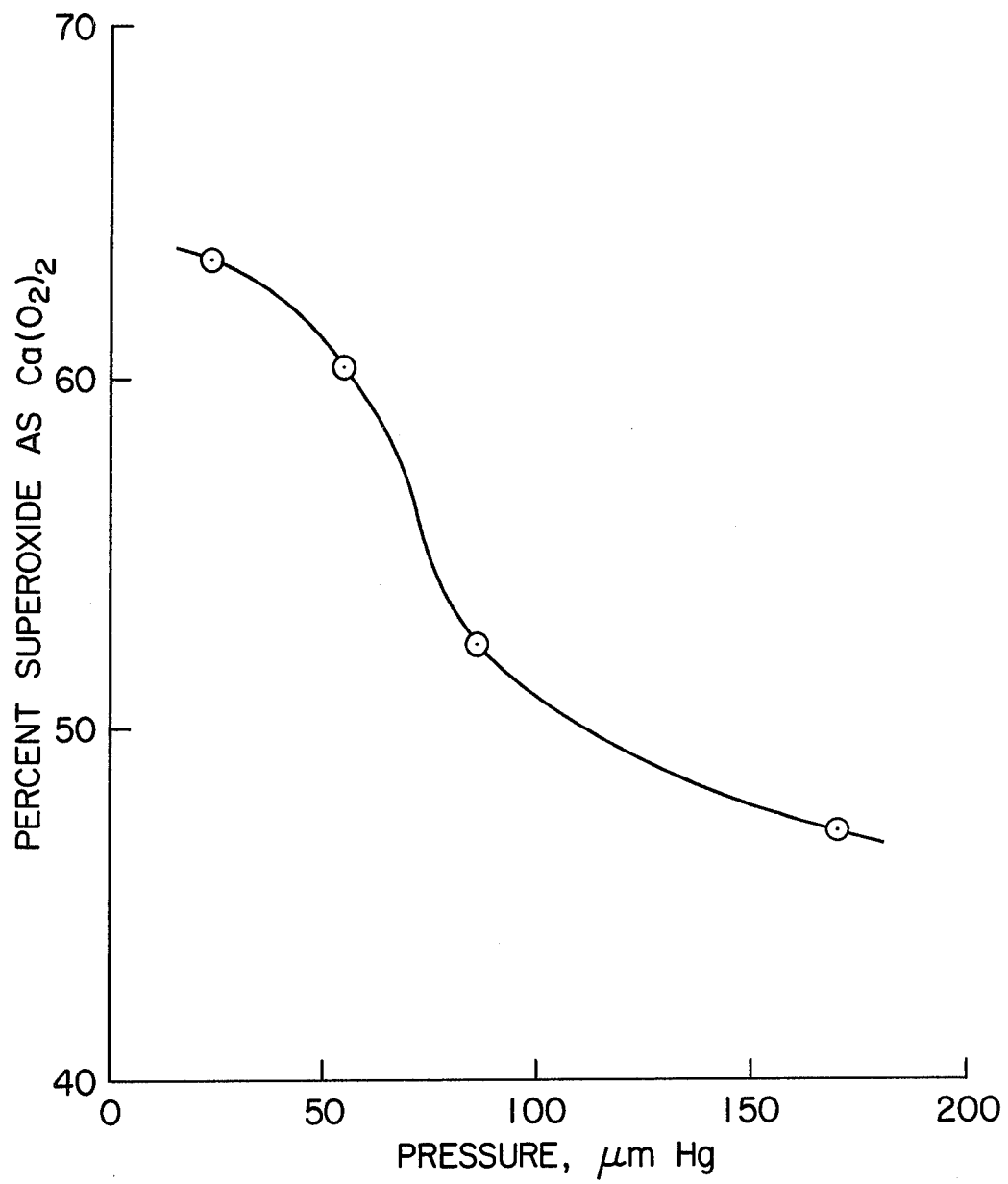

It should be noted however that when an inert gas sweeping system is employed, as in Example 2, the pressure considerations just discussed are irrelevant since the removal of the evolved heat and water from the reacting material is accomplished by the gas flow. In such circumstances, the lowest possible pressures are favored. This is clearly shown in FIG. 7 for 3 hour runs at 20° C with a spread factor of 158–159 cm² per gram and a nitrogen sweep of 8.1 cc STP per minute.

EXAMPLE 5

Calcium superoxide was prepared with the apparatus and in the manner of Example 4, with the exception that a molecular sieve desiccant No. 5A (Union Carbide Corporation) was placed in close proximity to the reacting material. Pressures of 8.8–9.2 × 10³, 8.8–9.5 × 10¹ and 300–302 × 10³ μm Hg were employed. As can be seen from the superoxide yields plotted in FIG. 6, the use of molecular sieve desiccant generally increases the purity yield of superoxide under higher pressure conditions.

EXAMPLE 6

Decomposition reactions were carried out in an apparatus of the type shown in FIG. 1, with the reactant container support 3 maintained at subambient temperatures, i.e., at about 0° C. The conditions employed were the same for each run except for the loading factor which was varied from 312 to 46 cm² per gram diperoxyhydrate. The effect of such cooling is clearly shown by the data summarized in Table III, wherein a fairly constant superoxide purity yield is recorded for all load levels shown.

TABLE III

LOW TEMPERATURE SPREADING AREA EXPERIMENTS WITH CaO$_2$ · 2H$_2$O$_2$ REACTANT

| Sample No. | Temperature[1] of dish, °C | Pressure[2], μm Hg Initial | Pressure[2], μm Hg Maximum | Pressure[2], μm Hg Minimum | Time[3] h | Spreading area cm²/g CaO$_2$ · 2H$_2$O$_2$ | % Superoxide[4] as Ca(O$_2$)$_2$ | % Peroxide[5] as CaO$_2$ |
|---|---|---|---|---|---|---|---|---|
| 1 | 0 | 0.4 | 0.18 | 0.1 | 20 | 312 | 59.4 | 12.3 |

TABLE III-continued
LOW TEMPERATURE SPREADING AREA EXPERIMENTS WITH CaO$_2$ · 2H$_2$O$_2$ REACTANT

| Sample No. | Temperature[1] of dish, °C | Pressure[2], μm Hg Initial | Maximum | Minimum | Time[3] h | Spreading area cm$^2$/g CaO$_2$ · 2H$_2$O$_2$ | % Superoxide[4] as Ca(O$_2$)$_2$ | % Peroxide[5] as CaO$_2$ |
|---|---|---|---|---|---|---|---|---|
| 2 | 0 to 1 | 0.6 | 0.65 | 0.15 | 21 | 78 | 60.3 | 12.6 |
| 3 | 0 | 0.6 | 1.7 | 0.4 | 21 | 36 | 61.2 | 11.7 |
| 4 | 0 to 1 | 1.5 | 1.1 | 0.2 | 24 | 46 | 59.3 | 12.8 |
| 5 | 0 to 9 | 2.5 | 100 | 1.0 | 22 | 18 | no analysis | no analysis |
| 6 | 0 | 12 | 63 | 54 | 22 | 18 | no analysis | no analysis |

[1] °C + 273 = K
[2] μm Hg × 0.1333 = Pa
[3] h × 3.6 = ks
[4] from liquid water reaction at 273 K
[5] from permanganate titration

ANALYSIS OF CALCIUM SUPEROXIDE

It has been observed that the analysis of superoxide product yields in the 70+% range is accompanied by some inconsistencies which have never been seen with low superoxide contents. To circumvent these inconsistencies, an analytical technique has been developed based on the following equation:

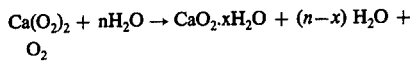

$$Ca(O_2)_2 + nH_2O \rightarrow CaO_2 \cdot xH_2O + (n-x) H_2O + O_2$$

The analysis is carried out by placing a sample of superoxide in distilled water and allowing it to decompose, preferably at 0° C. Alternatively, the sample may be subjected to sufficient water vapor to decompose the superoxide completely. The oxygen evolved is collected and measured in conventional apparatus and the quantity of superoxide originally present is calculated according to the equation just given. The superoxide yields obtained in this manner have been found to be about four percent lower than those obtained from the same material by the acetic acid-diethylphthalate method that has been used heretofore. A complete description and discussion of the new and the old analysis methods have been published by Ballou et al., "The Preparation of Calcium Superoxide From Calcium Peroxide Diperoxyhydrate," Ind. Eng. Chem., Prod. Res. Dev., Vol. 16, No. 2, 180–186, 1977, first presented at the San Diego Intersociety Conference on Environmental Systems, July 12–15, 1976. Ballou et al. also describe in that article as well as in "The Preparation of Calcium Superoxide at Subambient Temperatures and Pressures" [Am. Soc. Mech. Eng., Paper 77-ENAS-55, Seventh Intersociety Conference on Environmental Systems, San Francisco, Cal., July 11–14, 1977], some of the variations that can be carried out by the man skilled in the art in the process of this invention without departing from the spirit and the scope as defined by the appended claims. The Ballou articles are therefore incorporated into the present specification by reference.

What is claimed is:

1. A process for converting calcium peroxide diperoxyhydrate to calcium superoxide which comprises:
   (a) washing the calcium peroxide diperoxyhydrate with a dry polar solvent to obtain finely divided diperoxyhydrate;
   (b) spreading a thin layer of the finely divided washed diperoxyhydrate on the surface of a flat container over an area within the range of about 18 to about 300 cm$^2$ per gram;
   (c) positioning said container on a support structure in a reaction chamber;
   (d) partially evacuating said chamber to a pressure not greater than about 500 μm Hg;
   (e) allowing said diperoxyhydrate to reach a temperature not greater than about 40° C;
   (f) while maintaining said temperature, rapidly and systematically removing from the diperoxyhydrate zone the heat and water vapor released by the conversion of said compound;
   (g) backfilling the chamber with a dry inert gas; and
   (h) recovering the calcium superoxide produced.

2. The method of claim 1 wherein the solvent is dry isopropyl alcohol at a temperature within −10° to −18° C.

3. The process of claim 1 wherein the diperoxyhydrate has a maximum particle size within the range of 0.01 to 2.0 mm in diameter after washing.

4. The process of claim 1 wherein the removal of the water vapor is effected by condensation upon a cold surface located in the vicinity of the diperoxyhydrate.

5. The process of claim 4 wherein said cold surface is cooled by liquid nitrogen.

6. The process of claim 5 wherein the diperoxyhydrate is kept at a temperature within the range of about 30° to 40° C for a period of 60 to 90 minutes under a pressure within the range of 10 to 90 μm Hg, said temperature being maintained by the joint action of a coolant fluid circulating within the support structure and of a heat source.

7. The process of claim 6 wherein the heat source is infrared radiation.

8. The process of claim 6 wherein the coolant fluid has a temperature within the range of −20° to 17° C.

9. The process of claim 8 wherein the diperoxyhydrate is spread at a concentration within the range of about 36 to 300 cm$^2$ per gram and the temperature of the container is maintained at about 0° C for a period of about 24 hours.

10. A process for converting calcium peroxide diperoxyhydrate to a calcium superoxide which comprises:
   (a) spreading a thin layer of finely divided calcium peroxide diperoxyhydrate on a flat porous support in a chamber over an area within the range of 145 to 300 cm$^2$ per gram;
   (b) partially evacuating said chamber to a background pressure lower than 20 μm Hg;
   (c) allowing said diperoxyhydrate to reach a temperature not greater than 40° C;
   (d) while maintaining said temperature and keeping the chamber pressure at a level not greater than about 90 μm, passing a flow of cool dry inert gas through said porous support and diperoxyhydrate layer to sweep away evolved water and heat towards a liquid nitrogen cooled surface;
   (e) backfilling said chamber with nitrogen gas, after completion of the reaction; and
   (f) recovering the calcium superoxide produced.

11. The process of claim 10 wherein the dry inert gas is nitrogen at a temperature of about 0° to 30° C.

* * * * *